United States Patent [19]

Ishii et al.

[11] Patent Number: 5,146,394
[45] Date of Patent: Sep. 8, 1992

[54] FLY BACK CONVERTER SWITCHING POWER SUPPLY DEVICE

[75] Inventors: Takuya Ishii, Suita; Tatsuo Maeoka, Kobe, both of Japan

[73] Assignee: Matsushita Electric Industrial Co., Ltd., Osaka, Japan

[21] Appl. No.: 542,864

[22] Filed: Jun. 22, 1990

[30] Foreign Application Priority Data

Jun. 23, 1989 [JP] Japan .................... 1-161648
Jan. 18, 1990 [JP] Japan .................... 2-8623

[51] Int. Cl.⁵ .................................... H02M 3/335
[52] U.S. Cl. .................................... 363/16; 363/21; 363/97
[58] Field of Search ............ 363/18, 19, 20, 21, 363/97, 131, 15, 160

[56] References Cited

U.S. PATENT DOCUMENTS

| | | | |
|---|---|---|---|
| 3,582,754 | 6/1971 | Hoffman | 363/18 |
| 3,596,165 | 7/1971 | Andrews | 363/19 |
| 3,828,239 | 8/1974 | Nagai et al. | 363/20 |
| 4,027,200 | 5/1977 | Sahara et al. | 363/20 |
| 4,441,146 | 4/1984 | Vinciarcelli | 363/20 |
| 4,559,590 | 12/1985 | Davidson | 363/21 |
| 4,618,919 | 10/1986 | Martin | 363/16 |
| 4,639,663 | 1/1987 | Ueno et al. | 363/20 |
| 4,729,085 | 3/1988 | Truskalo | 363/17 |
| 4,809,148 | 2/1989 | Barn | 363/20 |
| 4,823,248 | 4/1989 | Ikeuchi et al. | 363/21 |
| 4,841,201 | 6/1989 | Takizawa et al. | 363/20 |
| 4,870,554 | 9/1989 | Smith | 363/131 |
| 4,905,136 | 2/1990 | Tanaka | 363/24 |
| 4,959,764 | 9/1990 | Bassett | 363/20 |
| 5,057,986 | 10/1991 | Henze | 363/21 |

FOREIGN PATENT DOCUMENTS

3840385 6/1989 Fed. Rep. of Germany .
2137030 9/1984 United Kingdom .

Primary Examiner—Steven L. Stephan
Assistant Examiner—Jeffrey Sterrett
Attorney, Agent, or Firm—Panitch Schwarze Jacobs & Nadel

[57] ABSTRACT

An improved regenerative control type power supply device having a higher efficiency is disclosed. The power supply device has: a first switching elements which is connected in series with the primary winding of a transformer (this series circuit is connected to the terminals of a DC power source); a second switching element; a capacitor which is connected in series with the second switching means (this series circuit is connected to the primary winding); a rectifying and smoothing circuit for rectifying and smoothing a flyback voltage which generates in the secondary winding and for outputting a resulting DC voltage; and a drive circuit for driving alternately the first and second switching means with predetermined ON-OFF periods.

6 Claims, 7 Drawing Sheets

_Fig. 3_

_Fig. 4_

PRIOR ART

FLY BACK CONVERTER SWITCHING POWER SUPPLY DEVICE

BACKGROUND OF THE INVENTION

1. Field of the Invention

The present invention relates to a switching power supply device for supplying a stabilized low DC voltage to an industrial or household electronic apparatus.

2. Description of the Prior Art

Recently, in the field of manufacturing electronic apparatuses, greater attention has been directed toward cost reduction, compactness, higher equipment performance, and energy saving. Accordingly, strong needs exist for a switching power supply device which is more compact and has higher output stability and higher operating efficiency.

Among conventional switching power supply devices, a self-excited flyback type switching power supply device has been widely used, because it consists of fewer parts and can be manufactured at a relatively low cost. It is known, however, that the switching frequency of such a device fluctuates depending upon degree of the output current, with the result that interferences occur in the operation of an associated electronic apparatus and that a larger size rectifying and smoothing circuit is required.

Figure 7:
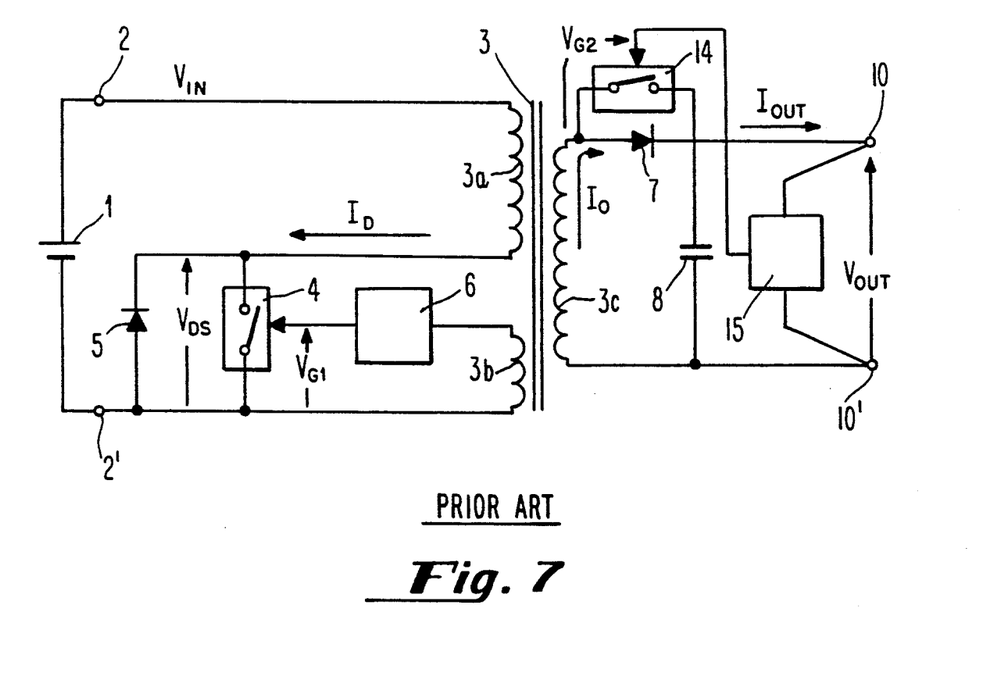
FIG. 7 is a circuit diagram of a conventional power supply device.

In an attempt to overcome such problems with the prior art devices, a switching power supply device of the regenerative control type has been proposed. FIG. 7 shows a switching power supply device of such a type. The device of FIG. 7 comprises a DC power source 1, a transformer 3, switching elements 4 and 14, a diode 5, a synchronizing oscillation circuit 6, a rectifying diode 7, a smoothing capacitor 8, a secondary switching element 14, and a control circuit 15.

The DC power source 1 rectifies an AC voltage and smoothes the resulting DC voltage. Alternatively it may consist of a battery or the like. The positive and negative terminals of the DC power source 1 are connected to input terminals 2 and 2', respectively. The transformer 3 has: a primary winding 3a connected at one terminal to the input terminal 2 and at the other terminal to the input terminal 2' through the switching element 4; a secondary winding 3c connected at one terminal to an output terminal 10' and at the other terminal to an output terminal 10 through the rectifying diode 7; and a bias winding 3b connected at one terminal to the input terminal 2' and at the other terminal to the synchronizing oscillation circuit 6. The switching element 4 turns ON or OFF in response to ON/OFF signals which are supplied at the control terminal from the synchronizing oscillation circuit 6, thereby applying the input voltage to the primary winding 3a and interrupting the voltage. The synchronizing oscillation circuit 6 actuates the switching element 4 to turn ON and OFF respectively for predetermined ON and OFF periods of time. The OFF period continues until the polarity of the induced voltage of the bias winding 3b is inverted. This repeated ON/OFF cycle causes continuous oscillation.

The energy accumulated in the transformer 3 during an ON period of the switching element 4 is released from the secondary winding 3c through the rectifying diode 7 or the switching element 14 to the smoothing capacitor 8 during an OFF period of the switching element 4. After the above-mentioned energy release, a secondary current is caused to flow reversely from the smoothing capacitor 8 to the secondary winding 3c through the switching element 14. The period of this reverse flow is controlled by the control circuit 15. The rectifier diode 7 is connected at its anode to one terminal of the secondary winding 3c and at its cathode to the output terminal 10. The smoothing capacitor 8 is connected between the output terminals 10 and 10'. The induced voltage appearing across the secondary winding 3c is rectified by the rectifying diode 7, and then smoothed by the smoothing capacitor 8 to provide an output voltage. The control circuit 15 compares the voltage appearing across the output terminals 10 and 10' with an internal reference voltage in order to vary the above-mentioned flow period of the secondary current through the secondary switching element 14.

Figure 8:
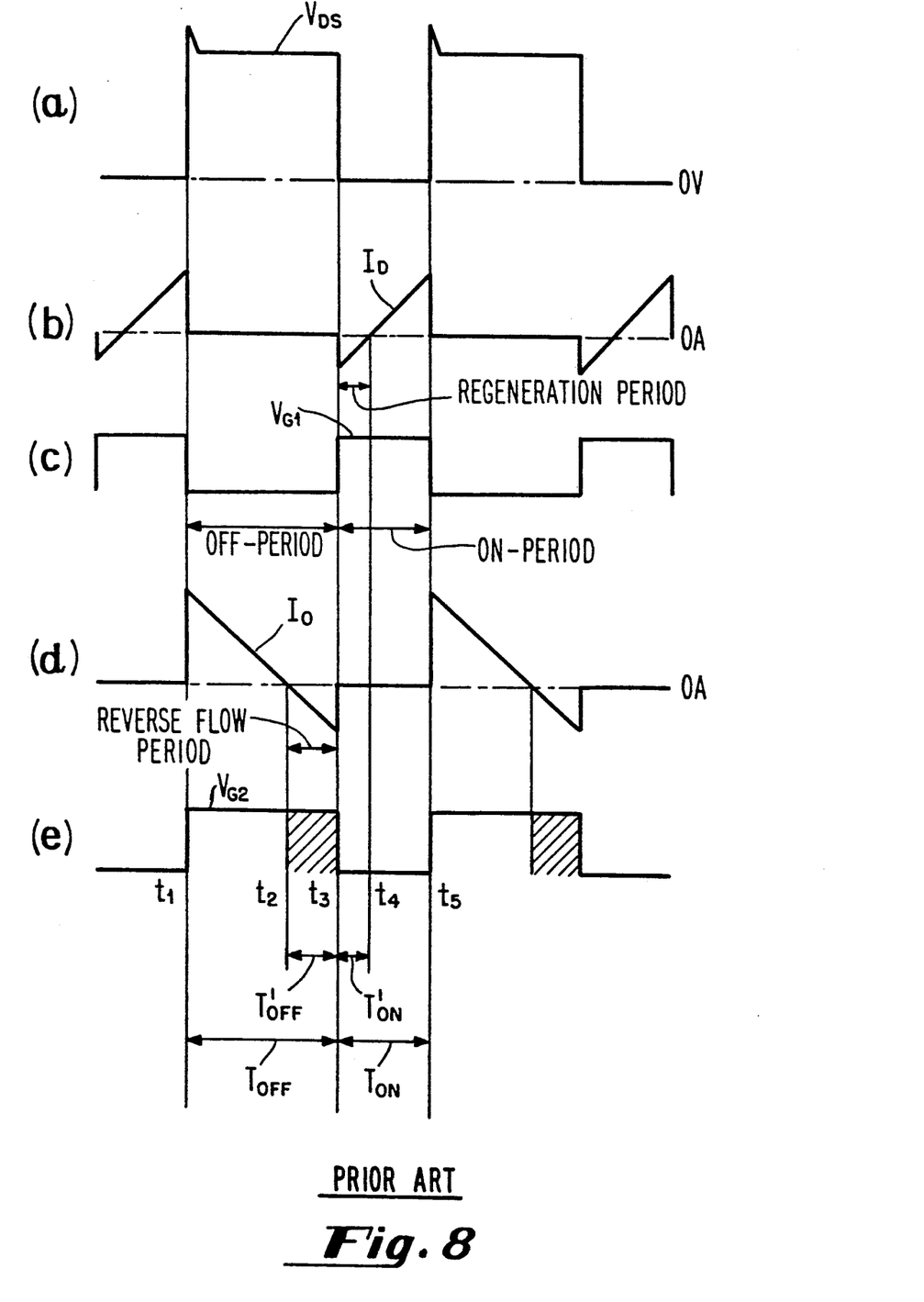
FIGS. 8 and 9 show waveforms of various portions of the device of FIG. 7.

The operation of the power supply device is described with reference to FIG. 8. In FIG. 8, (a) shows the waveform of a voltage $V_{DS}$ appearing across the switching element 4; (b) the primary current $I_D$ flowing through the primary winding 3a; (c) the waveform of driving pulse $V_{G1}$ output from the synchronizing oscillation circuit 6; (d) the secondary current $I_D$ flowing through the secondary winding 3c; and (e) the waveform of a driving pulse $V_{G2}$ for the secondary switching element 14. The hatched portions in (e) of FIG. 8 indicate reverse flow periods for causing the secondary current $I_o$ to reversely flow in the secondary winding 3c.

A magnetic flux develops in the transformer 3 as the primary current $I_D$ flows through the primary winding 3a during an ON period of the switching element 4 which period is determined by the synchronizing oscillation circuit 6, so that energy is accumulated in the tranformer 3, whereupon an induced voltage develops in the secondary winding 3c. It is so arranged that the rectifying diode 7 is reversely biased by the induced voltage and that the switching element 14 remains in its OFF-position. When the switching element 4 turns OFF in response to an OFF signal from the synchronizing oscillation circuit 6, a fly-back voltage develops in the primary winding 3a, and, simultaneously, a fly-back voltage is induced in the secondary winding 3c in such a direction that the rectifying diode 7 is forward biased. Accordingly, the energy accumulated in the transformer 3 is released as a secondary current $I_o$ through the secondary winding 3c, which is then smoothed by the smoothing capacitor 8 and supplied as an output voltage to the output terminals 10 and 10'. In this case, the switching element 14 is actuated to turn ON by the control circuit 15, but there occurs no particular operation change, through whichever the diode 7 or the switching element 14 the secondary current may flow.

When all the energy accumulated in the transformer 3 is released until the secondary current becomes zero, the voltage appearing across the smoothing capacitor 8, that is, output voltage, is applied to the secondary winding 3c through the switching element 14 which has been already in ON state, and accordingly the secondary current flows reversely from the smoothing capacitor 8, so that a magnetic flux is generated in the reverse direction in the transformer 3, thereby causing energy to be accumulated therein. In this condition, there is no change in the polarity of the induced voltage developing in each winding of the transformer 3, therefore, there is no change in the fly-back voltage in the bias winding 3b. Accordingly, the synchronizing oscillation circuit 6 causes the switching element 4 to remain in the OFF state.

As mentioned above, the ON period of the switching element 14 is controlled by the control circuit 15. When the switching element 14 becomes OFF, the induced voltage in each winding of the transformer 3 is inverted in polarity. Therefore, the induced voltage developing in the secondary winding 3c causes the rectifying diode 7 to be reversely biased. Since the switching element 14 is in the OFF state, the secondary winding current does not flow. In the primary winding 3a, the induced voltage develops in such a direction that the voltage at the terminal to which the switching element 4 is connected is negative, and, on the other hand, the voltage at the terminal to which input terminal 2 is connected is positive. Therefore, the primary current flows in such a direction that the DC power source 1 is charged through the diode 5, so that the energy accumulated in the transformer 3 during the OFF period is supplied to the DC power source 1 (i.e., the power regeneration is conducted). At this time, the polarity of the induced voltage developing in the bias winding 3b is also inverted, and accordingly the synchronizing oscillation circuit 6 actuates the switching element 4 to turn ON. In this case, there is no particular operational change, through whichever the diode 5 or the switching element 4 the primary current may flow.

When all the energy accumulated in the transformer 3 during the OFF period is released until the primary current is reduced to zero, the primary current flows from the DC power source 1 through the switching element 4 which has been already in the ON state, so that the transformer 3 is charged in the direction contrary to the that of the above-mentioned discharge, with the result that a magnetic flux develops in the transformer 3 and energy is thus accumulated therein. In this condition, there is no change in the polarity of the induced voltages developing in each windings of the transformer 3, and accordingly the synchronizing oscillation circuit 6 maintains to control the switching element 4 to be kept in the ON state.

When the switching element 4, the ON period of which is determined by the synchronizing oscillation circuit 6, is actuated to turn OFF, the energy accumulated in the transformer 3 is released as the secondary current through the secondary winding 3c. Cycles of these operations are repeated so that the output voltage is continuously supplied across the output terminals 10 and 10'.

The manner of performing the steady control of the output voltage will be described. In FIG. 8 showing the waveforms at various portions of the power supply device of FIG. 7, the OFF period (between times $t_1$ and $t_3$) of the driving pulse $V_{G1}$ in the synchronizing oscillation circuit 6 is represented by $T_{OFF}$, the reverse flow period (between times $t_2$ and $t_3$) of the secondary current $I_o$ is represented by $T'_{OFF}$, the ON period (between times $t_3$ and $t_5$) is represented by $T_{ON}$, and the regenerative period (between times $t_3$ and $t_4$) of the primary current $I_D$ is represented by $T'_{ON}$. Then, the current $I_{OUT}$ output from the output terminals 10 and 10' can be expressed by:

$$I_{OUT} = \frac{1}{2} \times V_{OUT} \times \frac{1}{L_S} \times \frac{T_{OFF}}{T} \times (T_{OFF} - 2T'_{OFF}) \quad (1)$$

The output voltage $V_{OUT}$ can be expressed by:

$$V_{OUT} = V_{IN} \times \frac{N_S}{N_P} \times \frac{T_{ON}}{T_{OFF}} \quad (2)$$
$$= V_{IN} \times \frac{N_S}{N_P} \times \frac{T'_{ON}}{T'_{OFF}}$$
$$= V_{IN} \times \frac{N_S}{N_P} \times \frac{T_{ON} - T'_{ON}}{T_{OFF} - T'_{OFF}}$$

The oscillation frequency f is expressed by;

$$f = \frac{1}{T_{ON} + T_{OFF}} = \frac{1}{T} \quad (3)$$

In the above expressions, $N_S$ represents the number of turns of the secondary winding 3c; $N_p$ represents the number of turns of the primary winding 3a; $L_S$ represents the inductance of the secondary winding 3c; and $V_{IN}$ represents the input voltage supplied from the DC power source 1.

The ON period $T_{ON}$ is kept at a constant value determined by the synchronizing oscillation circuit 6. If the output voltage $V_{OUT}$ is constant, therefore, the OFF period $T_{OFF}$ is constant, and the oscillation frequency f is also constant. However, the reverse flow period $T'_{OFF}$ may be varied by the secondary switching element 14 controlled by the control circuit 15, and $K = (\frac{1}{2}) \cdot V_{OUT} \cdot (1/L_S) \cdot (T_{OFF}/T)$ in the expression (1) is constant when the output voltage $V_t$ is constant. Even if the output current $I_{OUT}$ is varied, therefore, it can be controlled by changing the reverse flow period $T'_{OFF}$. Even if the input voltage $V_{IN}$ is varied, moreover, it can be controlled by changing the reverse flow period $T'_{OFF}$, as seen from the expression (2). Therefore, the output voltage $V_{OUT}$ can be controlled so as to be always kept constant by changing the reverse flow period $T'_{OFF}$. The reverse flow period $T'_{OFF}$ can be changed by controlling the ON period of the switching element 14 which is controlled by the control circuit 15.

Figure 9:
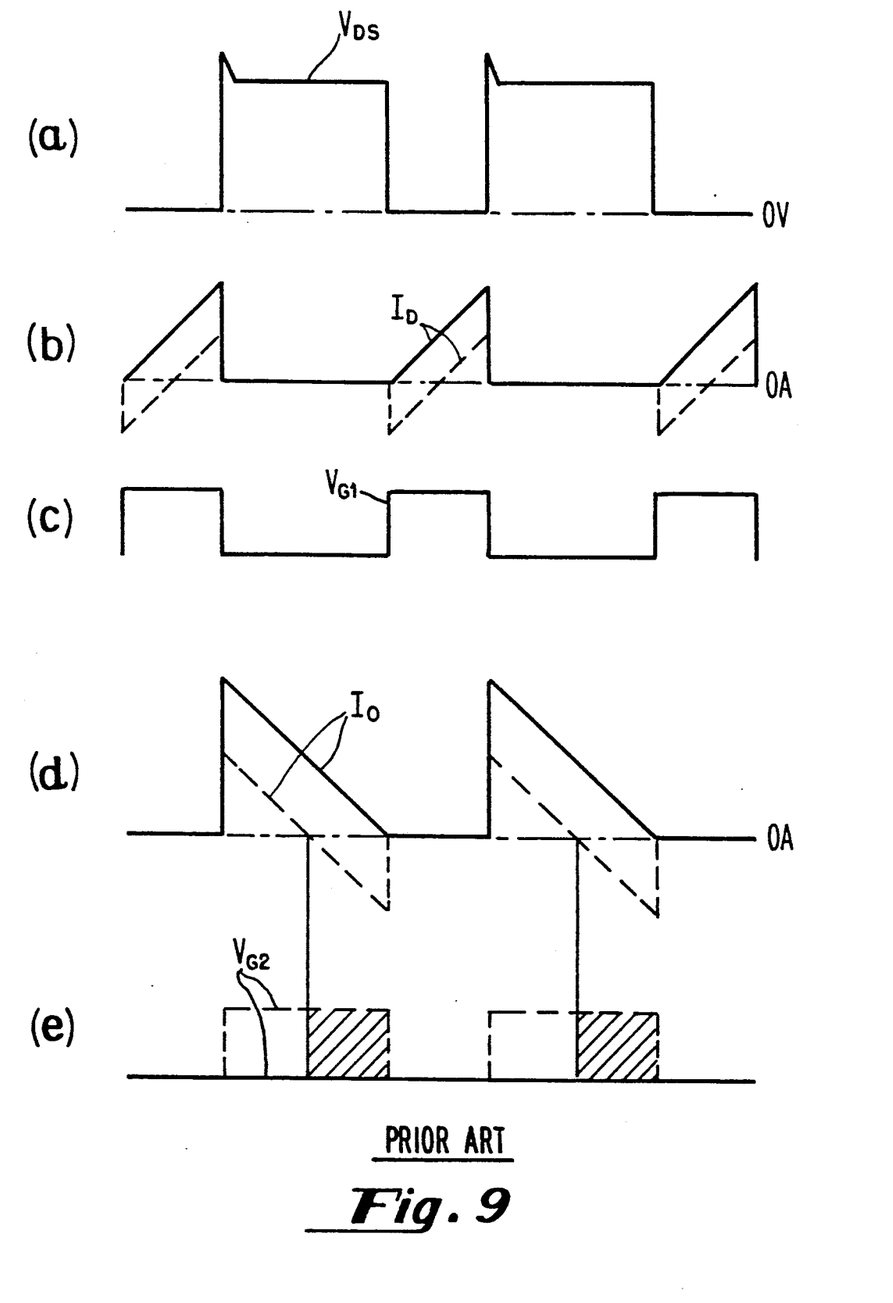

FIG. 9 shows various waveforms obtained when the output current $I_{OUT}$ is changed. In FIG. 9, solid lines indicate waveforms obtained when the output current $I_{OUT}$ flows at the maximum level from the output terminals 10 and 10', or at the so-called maximum load period, and broken lines indicate waveforms obtained when the output current $I_{OUT}$ is zero, or at the so-called no-load period. When the input voltage is constant, the ON period $T_{ON}$ is constant, and accordingly flux variation range $\Delta B$ is always constant.

In such a regenerative control type switching power supply device, when the switching element 4 turns OFF, a surge voltage occurs due to the leakage inductance in the transformer 3. At the maximum load, the level of the surge voltage is approximately the same extent as in a conventional self-excited fly-back type switching power supply device, and, at a light load, the level of the surge voltage is greater than that caused in such a self-excited fly-back type power supply device because the peak value of primary current is considerably higher immediately before the turn OFF. The conventional regenerative control type switching power supply device provides an advantage that because of its ability to regenerate energy at the turn ON of the switching element 4, even when a snubbing capacitor is connected between the both terminals of the switching element 4, the surge voltage at the turn-on can be efficiently restrained without involving any turn-on loss.

However, the resonance energy due to the capacitor and the leakage inductance of the transformer 3 is considerably great, so that ringing waveforms are superposed over another throughout each OFF period, which becomes a source of noise. The addition of a larger snubbing capacitor becomes a greater hindrance to realization of a higher switching frequency for compactness of the power source.

When the input DC power source is obtained from an AC power source through a rectifying and smoothing circuit, it is usual that the rectifying and smoothing circuit is of the capacitor input type which comprise a smoothing element and a capacitor and that the capacitor is used as an input capacitor which serves as a DC power source. Generally, it is desired that power supply devices have a higher efficiency and be small in size, and on the other hand the output holding time is required to be set in order to protect electronic apparatuses as a load from possible troubles such as momentary interruption of input power. In the prior art arrangement, the output holding time depends largely upon the static capacitance of the input capacitor, and, therefore, the static capacitance is determined by both the power capacity of the power source and the output holding time. For this reason, even when there is a sufficient ripple withstand capacity, there are cases where use of a larger input capacitor is required. In addition, the conducting period of the input current from the AC power source is shorter in the stage of steady operation so that the peak value of the input current becomes larger, thereby causing the problem in that the power factor and efficiency substantially drop.

SUMMARY OF THE INVENTION

The switching power supply device according to the invention, comprises a DC power source, and a transformer having at least primary and secondary windings, and further comprises: a first switching means which is connected in series with said primary winding, this series circuit being connected to the terminals of said DC power source; a second switching means; a capacitor which is connected in series with said second switching means, this series circuit being connected to the terminals of said primary winding; a rectifying and smoothing circuit for rectifying and smoothing a flyback voltage which generates in said secondary winding and for outputting a resulting DC voltage; and a drive means for driving alternately said first and second switching means with predetermined ON-OFF periods.

The switching power supply device according to the invention may further comprise at least one resonance capacitors which are connected respectively to the terminals of at least one of said first and second switching means and said primary and secondary windings.

The switching power supply device according to the invention comprising a transformer having at least primary and secondary windings, and further comprises: a rectifying circuit for receiving and rectifying an AC voltage, said rectifying circuit comprising at least one rectifying element; an input capacitor means for smoothing the output of said rectifying circuit: a first switching means which is connected in series with said primary winding, this series circuit being connected to said input capacitor means; a second switching means; a capacitor which is connected in series with said second switching means, this series circuit being connected to the terminals of said primary winding; a rectifying and smoothing circuit for rectifying and smoothing a flyback voltage which generates in said secondary winding and for outputting a resulting DC voltage; and a drive means for driving alternately said first and second switching means with predetermined ON-OFF periods.

At least one of said first and second switching means may comprise a switching element and a diode means which are connected in parallel.

Alternatively, said transformer further has a bias winding, and said driving means comprises: a first control means for driving said first switching means, said first control means being connected to said bias winding; and said and a second control means for driving said second switching means, said second control means being connected to the output terminals.

Thus, the invention described herein makes possible the objectives of:

(1) providing a switching power supply device which can efficiently inhibit any possible surge voltage and/or ringing waveform at the turn-off of the switching element, without detriment to the advantageous characteristics of the regenerative control type switching power supply device such that variations in switching frequency due to changes in load can be suppressed;

(2) providing a switching power supply device which can effectively reduce any possible switching noise; and (3) providing a switching power supply device which can reduce the static capacitance of the input capacitor without shortening the output holding time and thus broaden the conduction period of the input current.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

According to the invention, even if the potential of the first switching means is raised as a result of the turn-off of the switching means, the potential is clamped by the second switching means and the capacitor, and accordingly the occurrence of any surge voltage is inhibited. In addition, since the second switching means is ON at that time, the voltage present across the capacitor is applied to the primary winding of the transformer, there being little or no possibility of ringing occurrence.

According to the invention, the resonance capacitor connected to the switching means or to the both terminals of the switching means resonates with the leakage inductance of the transformer during the turn-on or turn-off operation, thereby lowering the rate of variation of the operating voltage, so that the level of switching noise can be reduced.

Moreover, the energy accumulated in the capacitor connected in series with the second switching means to the terminals of the primary winding of the transformer is released from the secondary winding through the transformer during each ON period of the second switching means, and therefore, longer output holding time can be obtained as compared with the prior art arrangement.

Figure 1:
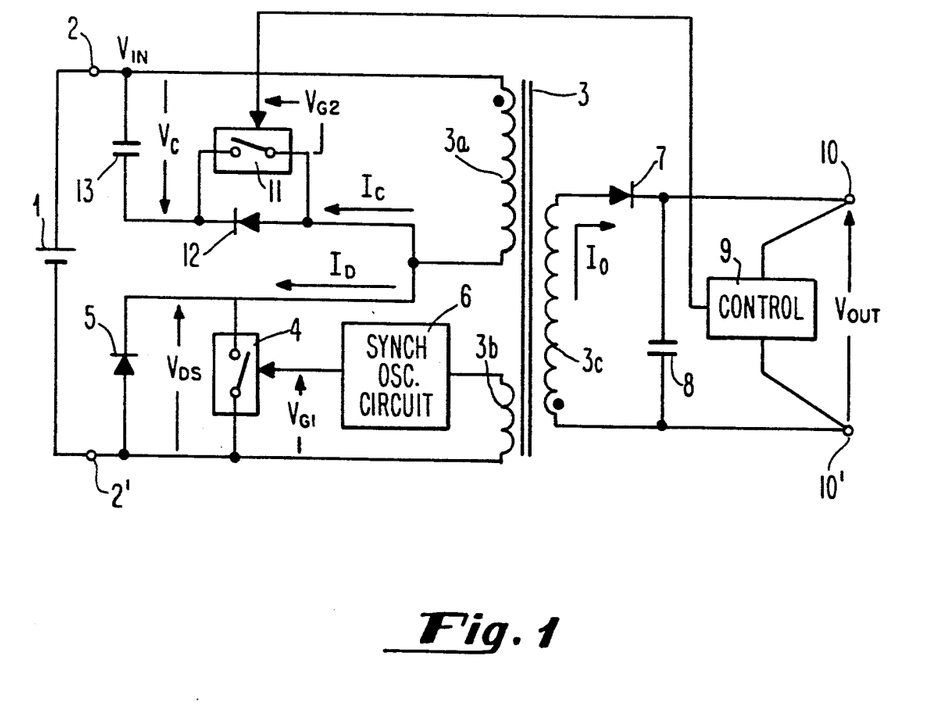
FIG. 1 is a circuit diagram of a power supply device according to the invention.

FIG. 1 shows a switching power supply device according to the invention. In FIG. 1, elements equivalent to those in FIG. 7 are designated by like reference numerals, and their detailed description is omitted. The device of FIG. 1 comprises a DC power source 1, a transformer 3, a switching element 4, a diode 5, a rectifying diode 7, a synchronizing oscillation circuit 6, a smoothing capacitor 8, and a control circuit 9. The switching element 4 and the diode 5 are connected in parallel, and constitute the first switching means. The switching element 4 is controlled by the synchronizing oscillation circuit 6. The rectifying diode 7 and the smoothing capacitor 8 constitute the rectifying and smoothing circuit. The transformer 3 comprises a primary winding 3a, a secondary winding 3c, and a bias winding 3b. The device of FIG. 1 further comprises another switching element 11 which is controlled by the control circuit 9, another diode 12, and a capacitor 13. The switching element 11 and the diode 12 are connected in parallel, and constitute the second switching means. The control circuit 9 has input portions connected respectively to output terminals 10 and 10'. The input portions of the control circuit 9 are electrically separated from the output portions connected to the switching element 11.

The operation of the switching power supply device will be described with reference to FIG. 2 in which waveforms at various portions of the device are shown.

Figure 2:
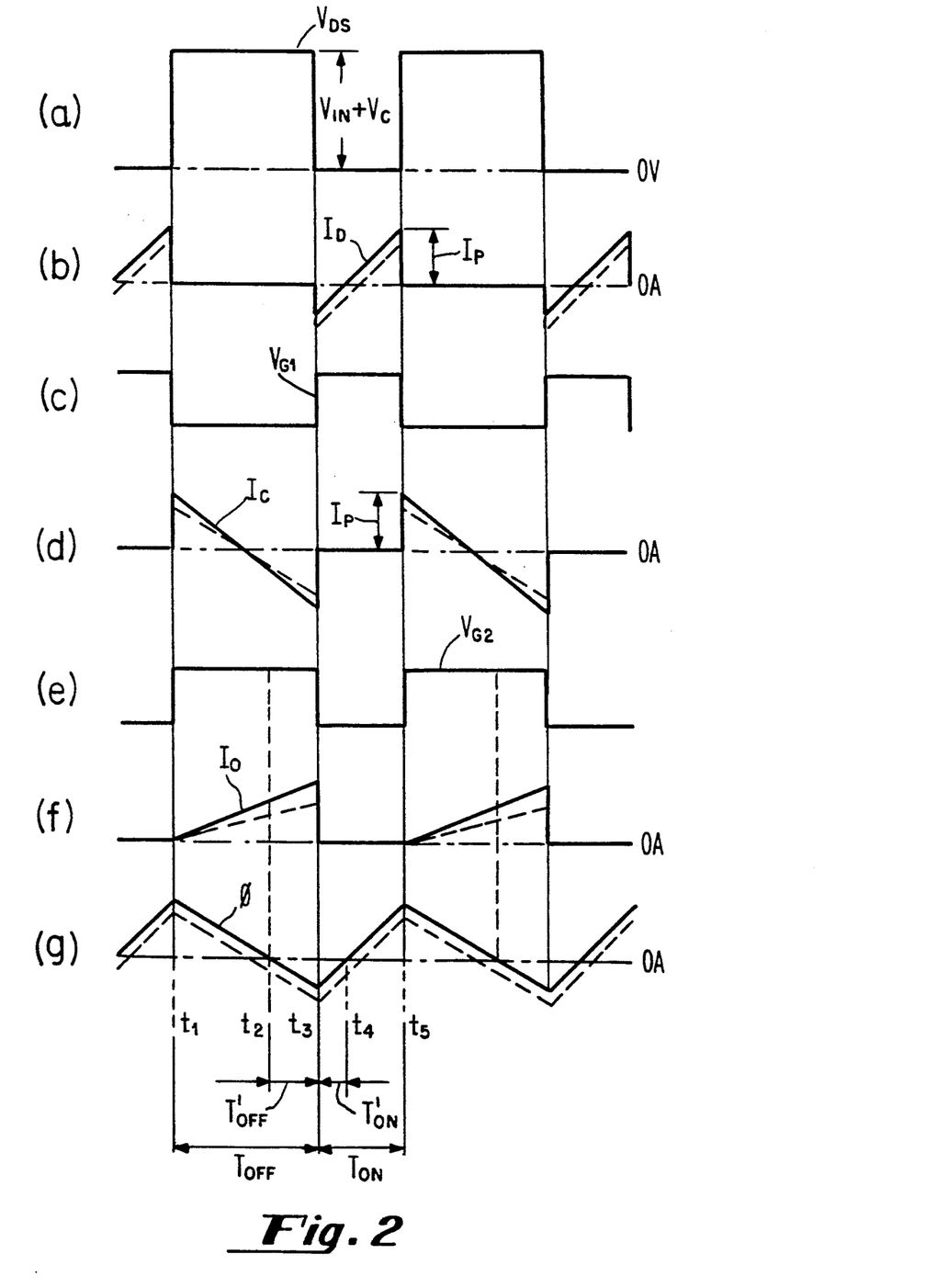
FIG. 2 shows waveforms at various portions of the device of FIG. 1.

In FIG. 2, (a) shows the waveform of a voltage $V_{DS}$ present across the switching element 4; (b) a primary current $I_D$ flowing through the switching element 4 or the diode 5; (c) the waveform of a driving pulse $V_{G1}$ output from the synchronizing oscillation circuit 6; (d) a primary current $I_c$ flowing through the switching element 11 or the diode 12; (e) the waveform of a driving pulse $V_{G2}$ for the switching element 11; (f) a secondary current $I_o$ flowing through the secondary winding 3c; and (g) the variation in the magnetic flux $\phi$ of the transformer 3.

As the primary current $I_D$ flows through the primary winding 3a during an ON period of the switching element 4 which period is determined by the synchronizing oscillation circuit 6, a magnetic flux develops in the transformer 3 so that energy is accumulated in the transformer 3, whereupon an induced voltage develops in the secondary winding 3c. The secondary winding 3c is wound in such a manner that the rectifying diode 7 is reversely biased by this induced voltage. It is so arranged that the diode 12 in the primary side is reversely biased by this induced voltage, and also that the switching element 11 is controlled so as to remain in its OFF-position under this condition. When the switching element 4 turns OFF in response to an OFF signal from the synchronizing oscillation circuit 6, a flyback voltage develops in the primary winding 3a, and the diode 12 is forward biased. Simultaneously, a flyback voltage is induced also in the secondary winding 3c in such a direction that the rectifying diode 7 is forward biased. Accordingly, the energy accumulated in the transformer 3 is released as a primary current $I_c$ through the primary winding 3a and the diode 12 and also as a secondary current $I_o$ through the secondary winding 3c. The primary current $I_c$ is then smoothed by the capacitor 13 to be supplied as a DC voltage $V_c$, and the secondary current $I_o$ is smoothed by the smoothing capacitor 8 to be supplied as an output voltage to the output terminals 10 and 10'. In this case, the switching element 11 is actuated to turn ON by the control circuit 9, but there occurs no particular operation change, through whichever the diode 12 or the switching element 11 the primary current $I_c$ may flow.

When capacitance components such as a parasitic capacitance are not considered, the energy accumulated in the transformer 3 begins to be released first from the primary winding 3a under the influence of the leakage inductance, at the voltage reverse in each windings of the transformer 3 caused by the OFF operation of the switching element 4. That is, the primary current $I_c$ begins to flow with the initial value which coincides with the final value $I_p$ of the primary current current $I_D$, while the secondary current $I_o$ rises from zero. In this case, the magnetic flux $\phi$ in the transformer 3 decreases linearly, because the accumulated energy in the transformer 3 is released while the DC voltage $V_c$ is applied to the primary winding 3a. Accordingly, the primary current $I_c$ decreases monotonously until it is finally reduced to 0 Amp. Thereafter, since the switching element 11 is in the ON state, the discharge current from the capacitor 13 begins to flow to the primary winding 3a through the switching element 11. Since the DC voltage $V_c$ is applied to the primary winding 3a, the rectifying diode 7 is forward biased, so that the secondary current $I_o$ continues to flow.

After the energy accumulated in the transformer 3 has been completely released while the switching element 4 is ON, the DC voltage $V_c$ remains to be applied by the switching element 11, whereby the transformer 3 is reversely excited and energy is accumulated therein in the inverse direction. When the switching element 11 is turned OFF by the control circuit 9, the voltages of the windings of the transformer 3 are inverted, and the rectifying diode 7 is reverse-biased, so that the flow of secondary current $I_o$ is ceased. Thus, the induced voltage in the primary winding 3a has a direction such that the polarity at the terminal to which the switching element 4 is connected is negative and the polarity at the terminal to which the input terminal 2 is connected is made postive. Accordingly, primary current $I_D$ flows through the diode 5 in a direction that the DC power source 1 is charged, whereby the energy accumulated in the transformer 3 during the OFF period is supplied to the DC power source 1 for power regeneration. In this case, the polarity of the induced voltage developing in the bias winding 3b is also inverted, and, accordingly, the synchronizing oscillation circuit 6 actuates the switching element 4 to turn ON; it is noted, however, that there is no particular change in operation, through whichever the switching element 4 or the diode 5 the primary current $I_D$ may flow.

When all the energy accumulated in the transformer 3 during the OFF period is released until the primary current is reduced to zero, the primary current $I_D$ flows from the DC power source 1 through the switching element 4 which is already in the ON state, in the direction opposite to the direction of the discharge, so that magnetic flux develops in the transformer 3, thereby accumulating energy therein. In this condition, there is no change in the polarity of the induced voltage developing in each windings of the transformer 3, and the switching element 4 is kept in the ON state by the synchronizing oscillation circuit 6. When the switching element 4 operating in ON intervals as determined by the synchronizing oscillation circuit 6 is turned OFF, the energy accumulated in the transformer 3 is released through the primary winding 3a to the capacitor 13, and is also released as the secondary current $I_o$ through the secondary winding 3c to the output. Through repetition of cycles of these operations the output voltage is continuously supplied from the output terminals 10 and 10'.

The manner of performing the steady control of the output voltage in the device of FIG. 1 will be described. In FIG. 2 showing the waveforms at various portions of the power supply device of FIG. 1, the OFF period (between times $t_1$ and $t_3$) of the driving pulse $V_{G1}$ in the synchronizing oscillation circuit 6 is represented by $T_{OFF}$, the period (between times $t_2$ and $t_3$) of reverse-exciting the transformer 3 is represented by $T'_{OFF}$, the ON period (between times $t_3$ and $t_5$) is represented by $T_{ON}$, and the regenerative period (between times $t_3$ and $t_4$) of the primary current $I_D$ is represented by $T'_{ON}$.

During the steady operation of the switching power supply device of the embodiment, there is little or no fluctuation in the DC voltage $V_c$ because the capacity of the capacitor 13 is sufficiently large. The primary current $I_c$ in the OFF period which is a ripple current is equal in both the charging and discharge periods, with the average current of 0 Amp. Therefore, the energy which is emitted from the secondary winding 3c and supplied from the output terminals 10 and 10' is equal to the difference between the energy accumulated in the transformer 3 during the ON period and the energy supplied to the DC power source 1 for regeneration during the period $T'_{ON}$. The DC voltage $V_c$ is expressed by the following expression:

$$V_c = \frac{T_{ON}}{T_{OFF}} \times V_{IN}$$

$$= \frac{T_{ON}}{T_{OFF}} \times V_{IN}$$

This becomes when, in the operation for stabilization of the output voltage as already described with respect to the prior art regenerative control type switching power supply device, the DC voltage $V_c$ is considered to be a no-load output voltage.

Further, from the fact that the output voltage $V_{OUT}$ in the switching power supply device of the embodiment is obtained by rectifying the flyback voltage of the secondary winding 3c, the following relation is obtained:

$$V_{OUT} \approx \frac{N_S}{N_P} \times V_c$$

Thus, it will be found that the output voltage $V_{OUT}$ can be regulated by adjusting the DC voltage $V_c$. For example, when the output current $I_{OUT}$ has been decreased and in turn the output voltage $V_{OUT}$ has risen, the ON period of the switching element 11 (i.e., the OFF period $T_{OFF}$ of the switching element 4) is made longer by the control circuit 9, so the amount of outgoing charge in the capacitor 13 becomes greater than the amount of incoming charge, with the result that the DC voltage $V_C$ is reduced. As the DC voltage $V_C$ decreases, the output voltage $V_{OUT}$ also decreases, and the voltage $V_C$ developed in and applied to the windings of the transformer 3 drops. Therefore, the gradient of the primary current $I_C$ is moderated so that the DC voltage $V_C$ finally reaches a level at which the output voltage $V_{OUT}$ becomes a predetermined value. That is, the output voltage $V_{OUT}$ can be stabilized by regulating the ON period of the switching element 11. Primarily, there is no much room for variation of the DC voltage $V_C$ for the purpose of correcting the fluctuation (load regulation) of the output voltage $V_{OUT}$ due to the fluctuation of the output current $I_{OUT}$. If the ON period $T_{ON}$ is constant, therefore, the OFF period $T_{OFF}$ is little liable to variation, and the switching frequency and magnetic flux variation range $\Delta B$ are generally constant as well. General aspects in this regard are shown by broken lines in FIG. 2.

Figure 3:
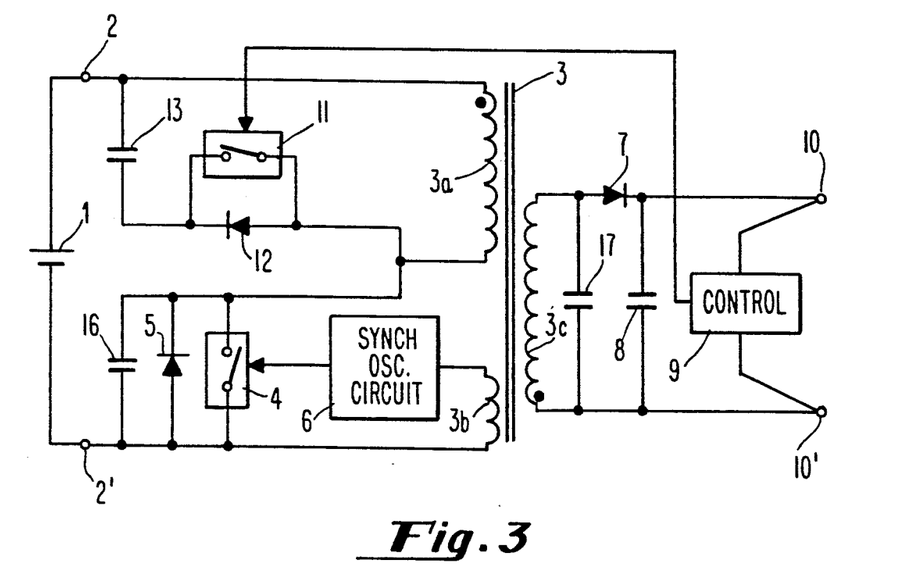
FIG. 3 is another circuit diagram of a power supply device according to the invention.

Another embodiment of the invention will described with reference to FIG. 3. The embodiment of FIG. 3 has a similar construction as that of the embodiment of FIG. 1 except that a capacitor 16 is connected in parallel with diode 5 and another capacitor 17 is disposed so as to bridge the terminals of the secondary winding 3c. The capacitors 16 and 17 function as resonance capacitors. By connecting the resonance capacitor 16 to the switching element 4 as shown in FIG. 3, it is possible to moderate possible rapid rise of the voltage waveform at each turn-off of the switching element 4. The switching power supply device of the embodiment has a similar power regeneration as that of the afore-described prior art regenerative type switching power supply device. The electric charge accumulated in the resonance capacitor 16 is supplied to the DC power source 1 for power regeneration during the turn-off period of the switching element 11, and therefore it is not reduced to a turn-on loss at the switching element 4. The resonance capacitor 17 connected to both terminals of the secondary wiring 3c can suppress a surge voltage which may develop across the rectifying diode 7 with the steep decrease to 0 Amp. of the secondary current $I_o$ at the turn-off of the switching element 11. Operations other than those in transition stages are the same as those before described with respect to the embodiment of FIG. 1, and therefore therir description is omitted.

The addition of these resonance capacitors has the effect that in transition stages, there will occur change in the output impedance of each windings of the transformer 3 and, more particlarly, during the OFF period of the switching element 4 there will be some change in the initial value of the current in each windings. However, this little affects the control operation, and rather produces an advantage in that the peak value of the primary current $I_C$ during the OFF period is lowered so that current loss is lowered as a whole.

The resonaance capacitor 16 may be connected to both terminals of the primary winding 3a or both terminals of the switching element 11. In either case, similar excellent effects can be obtained as well. The resonance capacitor 17 may be connected to both terminals of the rectifying diode 7, in which case similar effects can be obtained as well.

In the above-described embodiments, the ON period $T_{ON}$ is fixed, and the output voltage $V_{OUT}$ is stabilized by regulating the OFF period $T_{OFF}$. Alternatively, the OFF period $T_{OFF}$ is fixed, and the output voltage $V_{OUT}$ is stabilized by regulating the ON period $T_{ON}$. Further, it is also possible that the switching cycle ($T_{ON}+T_{OFF}$) of both the switching elements 4 and 11 is fixed, and the output voltage $V_{OUT}$ is stabilized by regulating the ON/OFF ratio. In any of the above mentioned ways, the invention can be carried out with same effect.

Figure 4:
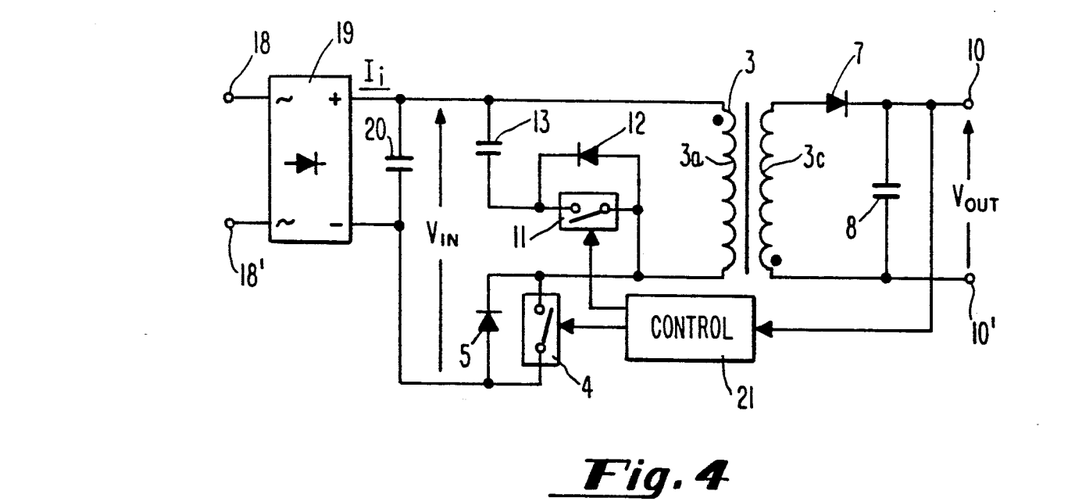
FIG. 4 is a further circuit diagram of a power supply device according to the invention.

FIG. 4 shows a further switching power supply device according to the invention. The embodiment of FIG. 4 comprises a full-wave rectifier circuit 19, an input capacitor 20 which is connected to the outputs of the full-wave rectifier circuit 19, and a control drive circuit 21. The embodiment of FIG. 4 is so constructed that the DC power source can be obtained by rectifying and smoothing AC power, and the other components of this embodiment may be constructed in the similar manner with those of the embodiment of FIG. 1. Namely, if the input capacitor 20 is taken as the DC input power source 1 in FIG. 1, the manner of the operation of the third embodiment is the same as that in the first embodiment. The control drive circuit 21 may be constructed so that it includes the bias winding 3b of the transformer 3, the synchronizing oscillation circuit 6, and the control circuit 9 in FIG. 1, or alternatively it may be a circuit which can execute such other output voltage stabilizing methods described above. Therefore, the description of the operation to this embodiment is omitted, and the manner of obtaining an output holding time which is longer as compared with that obtained in the conventional arrangement will be described with reference to FIG. 5.

Figure 5:
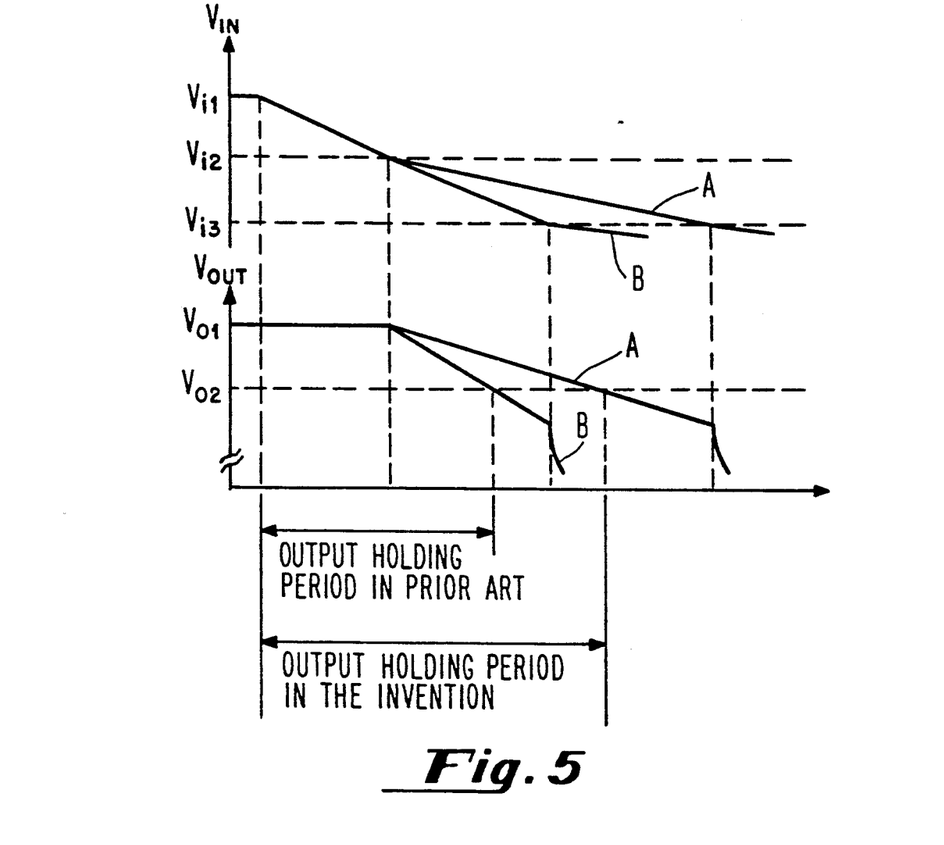
FIG. 5 is a graph showing the variation of the input and output voltages of the device of FIG. 4.

In FIG. 5, $V_{ol}$ is a set value of the DC output voltage $V_{OUT}$; $V_{o2}$ is the allowable lower limit of the DC output voltage $V_{OUT}$; $V_{il}$ is a value of the DC input voltage $V_{IN}$ during the steady operation; $V_{i2}$ is the stabilizied lower limit of the DC input voltage $V_{IN}$ at which the control drive circuit 21 outputs to the switching element 4 a driving pulse which has the maximum ON/OFF ratio; and $V_{i3}$ is the halt voltage at which the control drive circuit 21 halts. The output holding time is a period of time from the stop of energy suply from the AC power source and until the DC output voltage $V_{OUT}$ drops to a level below the allowable lower limit $V_{o2}$.

When the input is interrupted, the DC input voltage $V_{IN}$ begins to drop from the value $V_{il}$, but unitl it reaches the stabilized lower limit $V_{i2}$ the output voltage $V_{OUT}$ maintains the set value $V_{ol}$. During this period, the operation of the embodiment is similar to that of conventional device. When the DC input voltage $V_{IN}$ further drops to be lower than the stabilized lower limit $V_{i2}$, the driving pulse from the control drive circuit 21 to the switching element 4 is fixed to the maximum ON/OFF ratio, and as the DC input voltage drops, the output voltage $V_{OUT}$ begins to drop from the set value $V_{ol}$. In the conventional switching power supply device, the output energy is supplied only from the input capacitor 20. In contrast, according to this embodiment, energy is also supplied from the capacitor 13 during the OFF period of the switching element 4, with the result that the DC input voltage $V_{IN}$ and output voltage $V_{OUT}$ decrease at the rates which are lower than those in the conventional arrangement. In FIG. 5, curves indicated by "A" represent voltage variations in the present embodiment, and curves indicated by "B" represents those in the conventional arrangement. That condition continues until the DC input voltage $V_{IN}$ becomes lower than the halt voltage $V_{i3}$ so that operation is stopped. During this course the output voltage $V_{OUT}$ becomes lower than the allowable lower limit $V_{o2}$. In this way, according to the embodiment, the output holding time is longer than that in the conventional arrangement.

Figure 6:
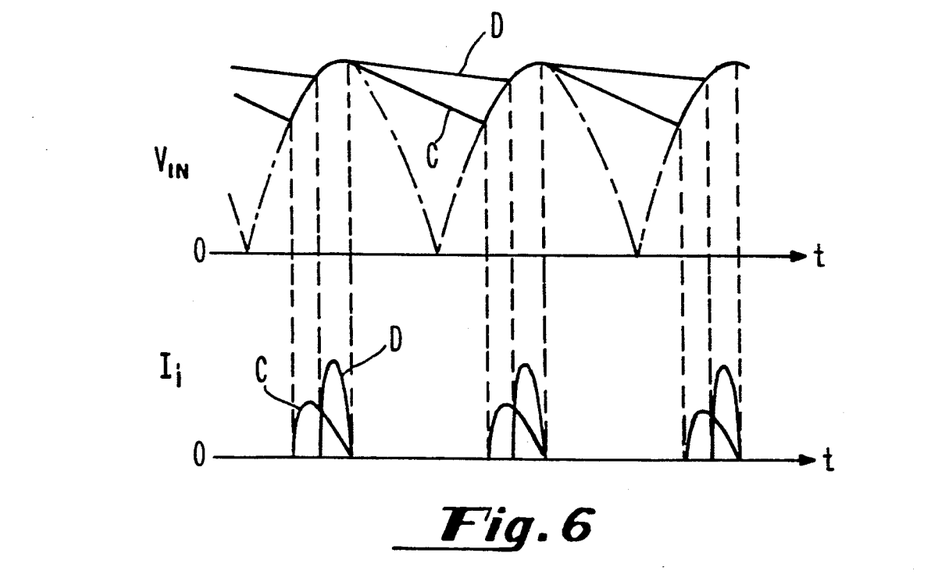
FIG. 6 shows waveforms of the input voltage and the input current of the device of FIG. 4.

According to the present embodiment, therefore, if the output holding time is to be maintained at the same level as in the prior art device, the static capacity of the input capacitor 20 can be decreased. FIG. 6 is a waveform diagram showing waveforms of the DC input voltage $V_{IN}$ and input current $I_i$ in the case in which the static capacity of the input capacitor 20 is small (curves C), and the case in which the static capacity is large (curves D). As is apparent from FIG. 6, if the input capacitor 20 which rectifies and smoothes the AC power source can be reduced in size, the conduction period of the input current $I_i$ can be lengthened so that the power factors can be improved. Moreover, the efficiency of the device can be improved by lowering the peak value of the input current $I_i$.

In the conventional regenerative control type switching power supply device, the rectifying element disposed at the secondary side of the transformer is provided with the switching element, and the energy at the secondary side is regenerated between the primary and secondary sides of the transformer thereby stabilizing the output. In contrast, according to the invention, a DC voltage obtained by rectifying and smoothing a flyback voltage in the primary winding is utilized, and the energy regeneration can be conducted using a rectifying element which is not provided with a switching means, whereby the output can be stabilized. Therefore, according to the invention, without detriment to the characteristic feature of the prior art arrangement in that there is no flutuation in the switching frequency and the magnetic flux variation range caused by the load, the voltage present during each OFF period of the primary side switching element is always clamped to the sum of the input voltage and the DC voltage, and it is thus possible to inhibit any excessive surge voltage and/or ringing during each turn-off period. Furthermore, the power regeneration is carried out on the primary side only and not between the primary side and the secondary side, so the power regeneration can be effected efficiently without producing loss of regenerated power due to the transformer efficiency.

According to the invention, moreover, the regenerative capability of the device permits the zero-cross turn-on and the addition of any resonance capacitor for reducing possible turn-off loss and/or high-frequency noise does not result in turn-on losses, but rather inhibits ringing occurrences as already mentioned, because the accumulated charge in the capacitor is supplied to the input power source for power regeneration. In particular, by the addition of such a resonance capacitor on the secondary side of the transformer, it is not only possible to protect the rectifying element against a surge voltage, but also possible to lower the peak value of the primary winding current during each OFF period. This naturally leads to an improved efficiency and improved reliability.

Further, according to the invention, when a DC input power source is to be obtained from an AC power source through a rectifying circuit and an input capacitor, the dependence on the static capacity of the input capacitor for output holding time is reduced so that the static capacity can be decreased, and the conduction period of the input current from an AC power source can be broadened. Also, the peak value of such current can be suppressed. Thus, an excellent switching power supply device which exhibits improved power factor and improved efficiency can be obtained.

It is understood that various other modifications will be apparent to and can be readily made by those skilled in the art without departing from the scope and sprit of this invention. According, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. In a switching power supply device comprising a DC power source, and a transformer having at least primary and secondary windings, said device further comprises:
    a first switching means which is connected in series with said primary winding, the series circuit being connected to the terminals of said DC power source:
    a second switching means;
    a capacitor which is connected in series with said second switching means, the series circuit being connected to the terminals of said primary winding;
    a rectifying and smoothing circuit of the capacitor input type for rectifying and smoothing a flyback voltage which generates in said secondary winding and for outputting a resulting low DC voltage; and
    drive means for detecting the DC output voltage from said rectifying and smoothing circuit and for driving alternately said first and second switching means with predetermined ON-OFF periods to stabilize the DC output voltage.

2. A power supply device according to claim 1, wherein at least one of said first and second switching means comprises a switching element and a diode means which are connected in parallel.

3. A power supply device according to claim 1, wherein said transformer further has a bias winding, and said driving means comprises: a first control means for driving said first switching means, said first control means being connected to said bias winding; and said and a second control means for driving said second switching means, said second control means being connected to the output terminals.

4. In a switching power supply device comprising a DC power source, and a transformer having at least primary and secondary windings, said device further comprises:
    a first switching means which is connected in series with said primary winding, the series circuit being connected to the terminals of said DC power source;
    a second switching means;
    a capacitor which is connected in series with said second switching means, the series circuit being connected to the terminals of said primary winding;
    a rectifying and smoothing circuit of the capacitor input type for rectifying and smoothing a flyback voltage which generates in said secondary winding and for outputting a resulting low DC voltage;
    a drive means for detecting the DC output voltage from said rectifying and smoothing circuit and for driving alternately said first and second switching means with predetermined ON-OFF periods for stabilizing the low DC output voltage; and
    at least one resonance capacitor which is connected respectively to the terminals of at least one of said first and second switching means and said primary and secondary windings.

5. A power supply device according to claim 4, wherein at least one of said first and second switching means comprises a switching element and a diode means which are connected in parallel.

6. A power supply device according to claim 4, wherein said transformer further has a bias winding, and said driving means comprises: a first control means for driving said first switching means, said first control means being connected to said bias winding; and said and a second control means for driving said second switching means, said second control means being connected to the output terminals.

* * * * *

UNITED STATES PATENT AND TRADEMARK OFFICE
CERTIFICATE OF CORRECTION

PATENT NO. : 5,146,394
DATED : September 8, 1992
INVENTOR(S) : Takuya Ishii et al.

It is certified that error appears in the above-identified patent and that said Letters Patent is hereby corrected as shown below:

Col. 14, line 2, delete "and said".

Col. 14, line 40, delete "and said".

In the Drawings:

Fig. 2(g), change "$\emptyset$" to --$\emptyset$--.

Fig. 2(g), change the direction of the left most arrow on $T'_{OFF}$ to point in the opposite direction.

Fig. 2(g), change the direction of the right most arrow on $T'_{ON}$ to point in the opposite direction.

Signed and Sealed this

Thirtieth Day of November, 1993

Attest:

BRUCE LEHMAN

Attesting Officer

Commissioner of Patents and Trademarks